(12) United States Patent
Filter et al.

(10) Patent No.: US 11,031,643 B2
(45) Date of Patent: Jun. 8, 2021

(54) SYSTEMS, METHODS, AND APPARATUS FOR OPTIMIZING BATTERY MODULE COOLANT FLUID FLOW

(71) Applicant: Faraday & Future Inc., Gardena, CA (US)

(72) Inventors: Evan J. Filter, Long Beach, CA (US); Saul Guzman Carranza, Glendale, CA (US)

(73) Assignee: Faraday&Future Inc., Gardena, CA (US)

(*) Notice: Subject to any disclaimer, the term of this patent is extended or adjusted under 35 U.S.C. 154(b) by 0 days.

(21) Appl. No.: 16/025,893

(22) Filed: Jul. 2, 2018

(65) Prior Publication Data

US 2020/0006827 A1    Jan. 2, 2020

(51) Int. Cl.
| | |
|---|---|
| *H01M 10/65* | (2014.01) |
| *H01M 10/6567* | (2014.01) |
| *H01M 10/613* | (2014.01) |
| *H01M 50/20* | (2021.01) |
| *B60K 6/28* | (2007.10) |
| *B60L 58/26* | (2019.01) |

(52) U.S. Cl.
CPC ..... *H01M 10/6567* (2015.04); *H01M 10/613* (2015.04); *H01M 50/20* (2021.01); *B60K 6/28* (2013.01); *B60L 58/26* (2019.02); *B60Y 2200/91* (2013.01); *B60Y 2200/92* (2013.01)

(58) Field of Classification Search
None
See application file for complete search history.

(56) References Cited

U.S. PATENT DOCUMENTS

| | | | | |
|---|---|---|---|---|
| 2008/0026284 A1* | 1/2008 | Fujii | ..................... | H01M 2/105 |
| | | | | 429/120 |
| 2008/0268328 A1* | 10/2008 | Lee | ....................... | H01M 2/105 |
| | | | | 429/83 |
| 2015/0210184 A1* | 7/2015 | Sun | ......................... | B60L 58/26 |
| | | | | 429/120 |
| 2019/0368827 A1* | 12/2019 | Blennius | ............ | H05K 7/20272 |

* cited by examiner

*Primary Examiner* — Ula C Ruddock
*Assistant Examiner* — Tony S Chuo
(74) *Attorney, Agent, or Firm* — Knobbe, Martens, Olson & Bear, LLP

(57) ABSTRACT

In one aspect, an apparatus for storing energy comprises an enclosure including a coolant fluid inlet configured to couple to a coolant fluid system, a plurality of energy-storage cells housed in an arrangement within the enclosure, and a cell holder. The cell holder has retaining features configured to hold the plurality of cells in the arrangement, a first surface forming a cavity between the cell holder and an adjacent wall of the enclosure and a plurality of holes that pass from the cavity through the cell holder and to the region of the enclosure housing the plurality of energy-storage cells. The coolant fluid inlet is in fluid communication with the cavity. Each of the holes is positioned proximate to a cell. Coolant fluid passes through the coolant fluid inlet into the cavity and through the holes to the cells to reduce a temperature of each of the cells.

20 Claims, 9 Drawing Sheets

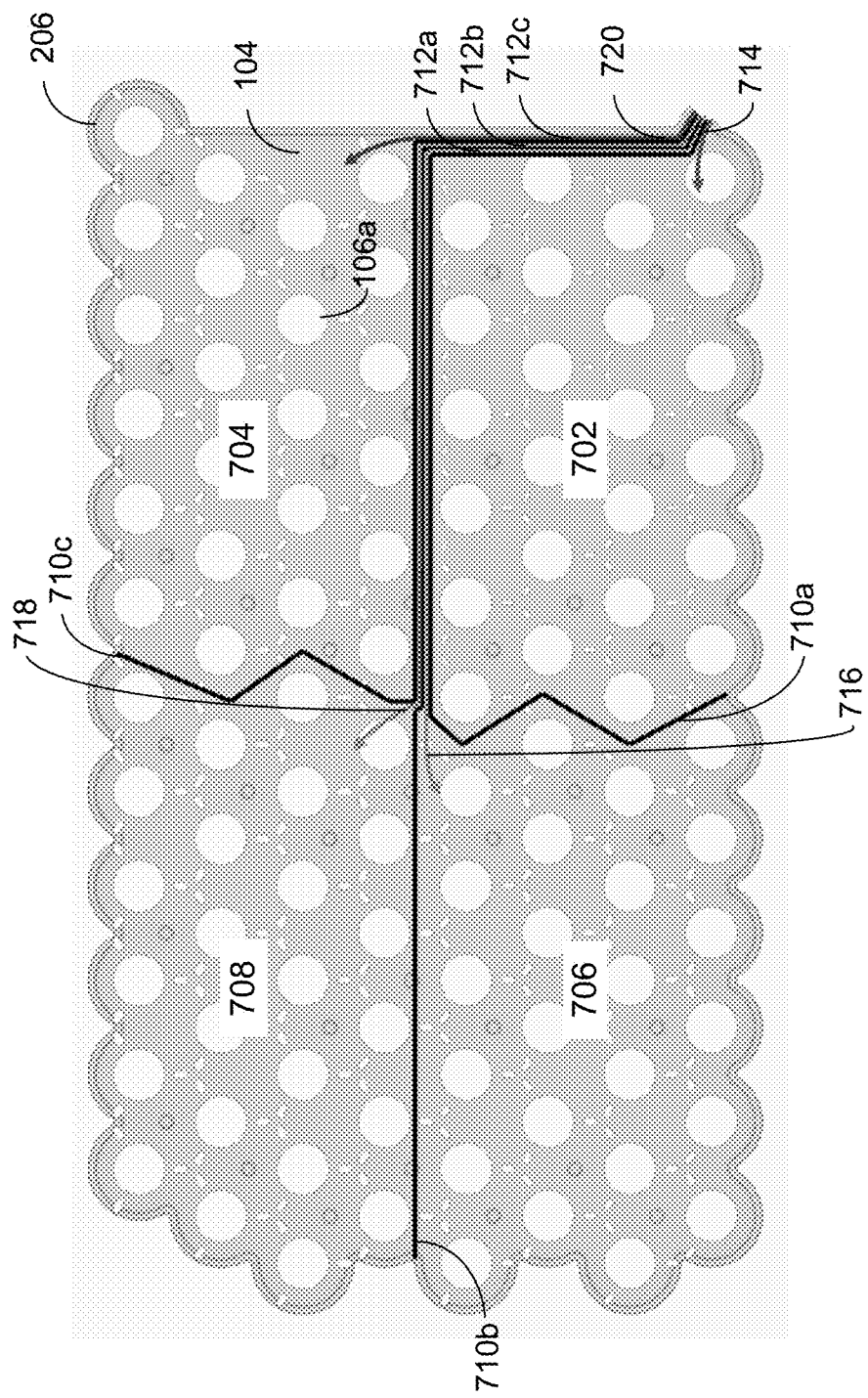

SYSTEMS, METHODS, AND APPARATUS FOR OPTIMIZING BATTERY MODULE COOLANT FLUID FLOW

FIELD

The present application relates generally to controlling temperatures of battery modules, and more specifically to systems, methods, and apparatus for optimizing coolant fluid flow in battery modules to maintain operating temperatures of the battery modules within predetermined constraints throughout the entire battery module.

BACKGROUND

Electric-drive vehicles offer a solution for reducing impacts of fossil-fuel consuming vehicle on the environment and creating a sustainable mode of transportation. Energy-storage systems are essential for the electric-drive vehicles, such as hybrid electric vehicles, plug-in hybrid electric vehicles, and all-electric vehicles. However, existing energy-storage systems have numerous disadvantages including large size, inefficiency, and poor safety, to name a few. Furthermore, similar to many existing energy-storage systems, heat in automotive energy-storage systems should be carefully managed.

SUMMARY

Various implementations of systems, methods and devices within the scope of the appended claims each have several aspects, no single one of which is solely responsible for the desirable attributes described herein. Without limiting the scope of the appended claims, some prominent features are described herein. Other features, aspects, and advantages will become apparent from the description, the drawings, and the claims.

In a first aspect, an apparatus for storing energy is disclosed. The apparatus comprises an enclosure including a coolant fluid inlet configured to couple to a coolant fluid system. The apparatus further comprises a plurality of energy-storage cells housed in an arrangement within a region of the enclosure. The apparatus also comprises a cell holder having retaining features configured to hold the plurality of cells in the arrangement. The cell holder also has a first surface forming a cavity between the cell holder and an adjacent wall of the enclosure, wherein the coolant fluid inlet is in fluid communication with the cavity. The cell holder further has a plurality of holes that pass from the cavity through the cell holder and to the region of the enclosure housing the plurality of energy-storage cells, wherein each of the plurality of holes is positioned proximate to a cell of the plurality of cells, wherein, in use, coolant fluid passes through the coolant fluid inlet into the cavity and through the plurality of holes to the plurality of cells to reduce a temperature of each of the plurality of cells.

In another aspect, a method of manufacturing an apparatus for storing energy is disclosed. The method comprises forming an enclosure, the enclosure including a coolant fluid inlet that couples to a coolant fluid system. The method further comprises forming a cell holder with a plurality of holes. The method also comprises inserting the cell holder into the enclosure, thereby forming a cavity between the cell holder and an adjacent wall of the enclosure, wherein the coolant fluid inlet is in fluid communication with the cavity. The method also further comprises retaining a plurality of cells in arrangement region of the enclosure via the cell holder, wherein the plurality of holes in the cell holder provide fluid passages from the cavity through the cell holder to the region of the enclosure housing the plurality of energy-storage cells, wherein each of the plurality of holes is positioned proximate to a cell of the plurality of cells. The method further also comprises providing coolant fluid to the plurality of cells via the coolant fluid inlet and the plurality of holes to reduce a temperature of each of the plurality of cells.

In an additional aspect, a method for cooling an apparatus for storing energy is disclosed. The method comprises providing power from a plurality of energy-storage cells housed in an arrangement within a region of an enclosure, the enclosure including a coolant fluid inlet that couples to a coolant fluid system and the plurality of energy-storage cells arranged according to a cell holder having a first surface forming a cavity between the cell holder and an adjacent wall of the enclosure, wherein the coolant fluid inlet is in fluid communication with the cavity. The method also comprises providing coolant fluid to each of the plurality of energy-storage cells via a plurality of holes that pass from the cavity through the cell holder and to the region of the enclosure housing the plurality of energy-storage cells, wherein each of the plurality of holes is positioned proximate to a cell of the plurality of cells. The method further comprises cooling each of the plurality of energy-storage cells with the coolant fluid that passes through the coolant fluid inlet into the cavity and through the plurality of holes to the plurality of cells by reducing a temperature of each of the plurality of cells.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

FIG. 7 illustrates a two-dimensional view of the cell duct that includes varying sizes of fluid flow openings in different regions of the cell duct and zone barriers that may control coolant fluid flow into each of the different regions of the cell duct, in accordance with certain embodiments described herein.

Figure 1:
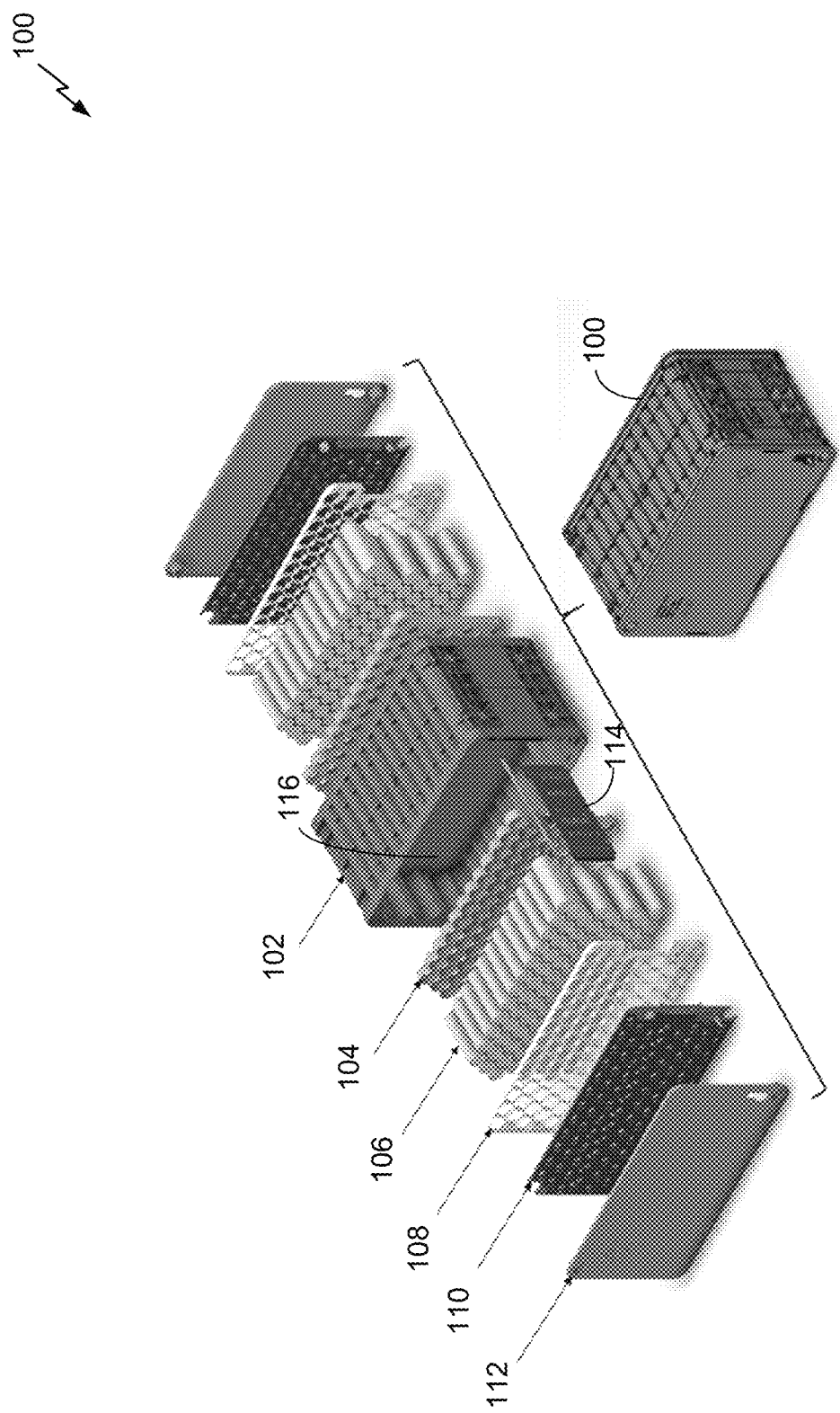
FIG. 1 shows an exploded view of components forming a battery module that may be used in energy-storage systems, such as that used in an electric vehicle (EV) system.

The various features illustrated in the drawings may not be drawn to scale. Accordingly, the dimensions of the various features may be arbitrarily expanded or reduced for clarity. In addition, some of the drawings may not depict all of the components of a given system, method or device. For example, various components from one or more drawings may be integrated into one or more other drawings, even if such a combination is not explicitly shown in the drawings. Finally, like reference numerals may be used to denote like features throughout the specification and figures.

DETAILED DESCRIPTION

Aspects of the present disclosure relate to thermal management of battery modules in electric vehicles (EV) or other vehicles having energy storage systems and/or modules where thermal management is a concern. Current thermal management schemes can require additional space within the automotive energy-storage system and/or may be inefficient at managing thermal properties of the automotive energy-storage systems. Existing energy-storage systems may also suffer from inefficiencies arising from thermal imbalance amongst battery cells and corresponding imbalance in the resistance in various electrical connections.

Thermal management of energy-storage modules in the EVs can have an important relationship with the safety of passengers, outside traffic and pedestrians, and the EV itself. Further, proper thermal management can increase the length of useful life of the EV and/or its energy-storage modules. The disclosed thermal management systems are able to properly keep the energy-storage modules within predetermined temperature ranges, and are further able to maintain each battery cell within a particular module at substantially the same temperature (for example, such that each of the modules have, at most, a small range of temperatures at different locations within the module) are desired. In some embodiments, such thermal management systems may provide benefits such as added reliability of the energy-storage modules and improved lengths of life for the energy-storage modules. In some embodiments, the energy-storage modules may use fluid or liquid coolant to assist in thermal management (referred to herein as "active cooling"). Accordingly, methods, systems, and apparatus for optimizing battery module coolant fluid flow are desired.

Beneficially, the disclosed technology is able to provide active cooling to each cell of the energy-storage module to maintain temperatures of the module within a predetermined range monitor and to maintain temperatures of the cells within the energy-storage modules within a predetermined number of degrees of each other. For example, during operation of a system providing active cooling with optimized coolant fluid flow to the energy-storage module, the temperature of the energy-storage module may be maintained within predetermined temperature requirements. Additionally, the temperature of each individual cell within the energy-storage module may be maintained at even temperatures, for example within +/– ten degrees Celsius of one another in some embodiments, or within +/– five degrees Celsius of one another in some embodiments. The disclosed technology includes coolant distributing structures designed to assist with maintaining such even temperatures across cells of an energy-storage module.

In some embodiments, the temperature of the energy-storage module may comprise an average of temperature measurements of each cell within the energy-storage module. In some embodiments, the temperature of the energy-storage module may be obtained by averaging one or more values from one or more temperature sensors positioned within or proximate to the energy-storage module. In some embodiments, the temperature of the energy-storage module may be based on a measured temperature of the coolant fluid as it exits or leaves the energy-storage module. Embodiments of the disclosed technology address this challenge, among others, by providing coolant distributing structures that vary the volume and/or pressure of coolant fluid flow to different locations within the energy-storage module. The coolant distributing structures can provide optimized coolant fluid flow to various regions of the energy-storage module in order to maintain even temperatures across the cells of the module.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

In electric vehicles (EVs), energy-storage modules may be used in various systems, including high voltage systems, for example, vehicle drive systems, or low voltage systems, for example, accessory systems. The described systems, methods, and apparatus may be utilized in conjunction with energy-storage modules used in any such system.

The techniques described herein may be used for various EV, hybrid electric vehicle (HEV), or electric motors systems, EV systems, electric power generators, electric pumps, or any other electricity powered system that consumes energy from an energy-storage system. The teachings herein may be incorporated into (for example, implemented within or performed by) a variety of electric storage systems.

FIG. 1 shows an exploded view of components forming a energy-storage module 100 that may be used in energy-storage systems, such as that used in an electric vehicle (EV) system. The energy-storage module 100 may comprise a shell 102, one or more cell ducts 104, one or more sets of cells 106 (for example, batteries, capacitors, or other energy-storage cells), one or more cell retainers 108, one or more interconnecting boards 110, one or more module covers 112, and a circuit board 114. The energy-storage module 100 may be a sealed pressure vessel that houses the individual cells 106, their retainers 108, and interconnecting boards 110. The plurality of cells 106 are supported by the cell retainer 108 and the cell duct 104. As illustrated, the shell 102 may be dual-sided in that it has a first sealed enclosure that houses a first set of the cell duct 104, cell 106, cell retainer 108, and interconnecting board 110 on a first side and has a second sealed enclosure housing a second set of the cell duct, cell, cell retainer, and interconnecting board (not labeled) on a second side. The first and second sets of these components may be arranged mirror to one another, as illustrated in FIG. 1, such that both cell ducts 104 rest against opposing sides of a common floor 116 of the shell 102. Other implementations of the energy storage module may include a single set of these components.

In some embodiments, the shell 102 may comprise one or more connectors or inlets and outlets for cooling fluid flow through the energy-storage module 100. In some embodiments, coolant or cooling liquid or cooling fluid may include, for example, one or more of the following: synthetic oil, polyolefin (e.g., poly-alpha-olefin ("PAO")), ethylene glycol, ethylene glycol and water, and phase change materials ("PCM"). In some aspects, battery cooling systems employ liquid dielectrics as the coolant. The coolant may be configured to transfer heat from the liquid coolant to the shell 102. The shell 102 may include one or more heat sinks. In some embodiments, liquid may be circulated through the shell 102 and/or through a heat exchanger. The module cover 112 may seal the open side(s) of the housing(s) formed by the shell 102.

The cell duct 104 includes holding features that hold the cells 106 in a particular position, for example apertures or recesses sized to receive a cell 106 and retain it in a substantially fixed position and/or orientation. The cell duct 104 can also include one or more fluid distributing structures that provide for the disclosed flow of cooling fluid from the shell 102 around the cells 106. For example, coolant can be provided to the energy-storage module 100 through the shell 102, may flow along the floor 116 of the shell 102, and may be pushed (e.g., via fluid pressure) through the fluid distributing structures of the duct 104 to the cells 106. Further details regarding the fluid distributing structures are described below.

The cells 106 are arranged between the duct 104 and retainer 108 within the enclosure of the energy-storage module 100. In some embodiments, the cells 106 may be arranged in an array where adjacent rows or columns of cells 106 are offset or interleaved with respect to each other. In some embodiments, the cells 106 may be arranged in groups or in a non-interleaved array. In some embodiments, the cell retainer 108 may comprise one or more features that holds the one or more cells 106 in its position or alignment, for example apertures or recesses aligned with corresponding apertures or recesses of the duct.

The interconnecting board 110 can connect the cells 106 in a predetermined configuration (for example, in series, parallel, and so forth). For example, the interconnecting board 110 can include one or more layers of conductive (and optionally, electrically insulating) material to provide electrical contacts for the cells 106. The interconnecting board 110 can also form circuitry used to control one or more functions of the energy-storage module 100. For example, the interconnecting board 110 may include one or more thermistors to allow external battery monitoring circuitry to monitor and/or control the temperature of the interconnecting board 110 and/or some or all of the cells 106 connected thereto. As another example, the interconnecting board 110 may include one or more voltage monitoring leads to allow external battery monitoring circuitry to monitor and/or control a voltage drop across some or all of the cells 106. In some embodiments, the interconnecting board may provide paths for coolant to flow between and around the cells 106 within the energy-storage module 100.

In some embodiments, the energy-storage module 100 includes an active cooling system, where fluid coolant flows through an opening in the shell 102 into a cavity between an underside of the cell ducts 104 and the shell 102 and is then forced through small holes in the cell ducts 104 that surround each cell 106. The terms "upper," "lower," "top," "bottom," "underside," "top side," "above," "below," and the like, which also are used to describe the present battery systems, are used in reference to the illustrated orientation of the embodiment. For example, the "underside" of the cell duct 104 may be used to describe the surface closest to the floor of the shell 102 onto which it is loaded, while the term "top side" may be used to describe the location of the module cover 112.

Figure 2:
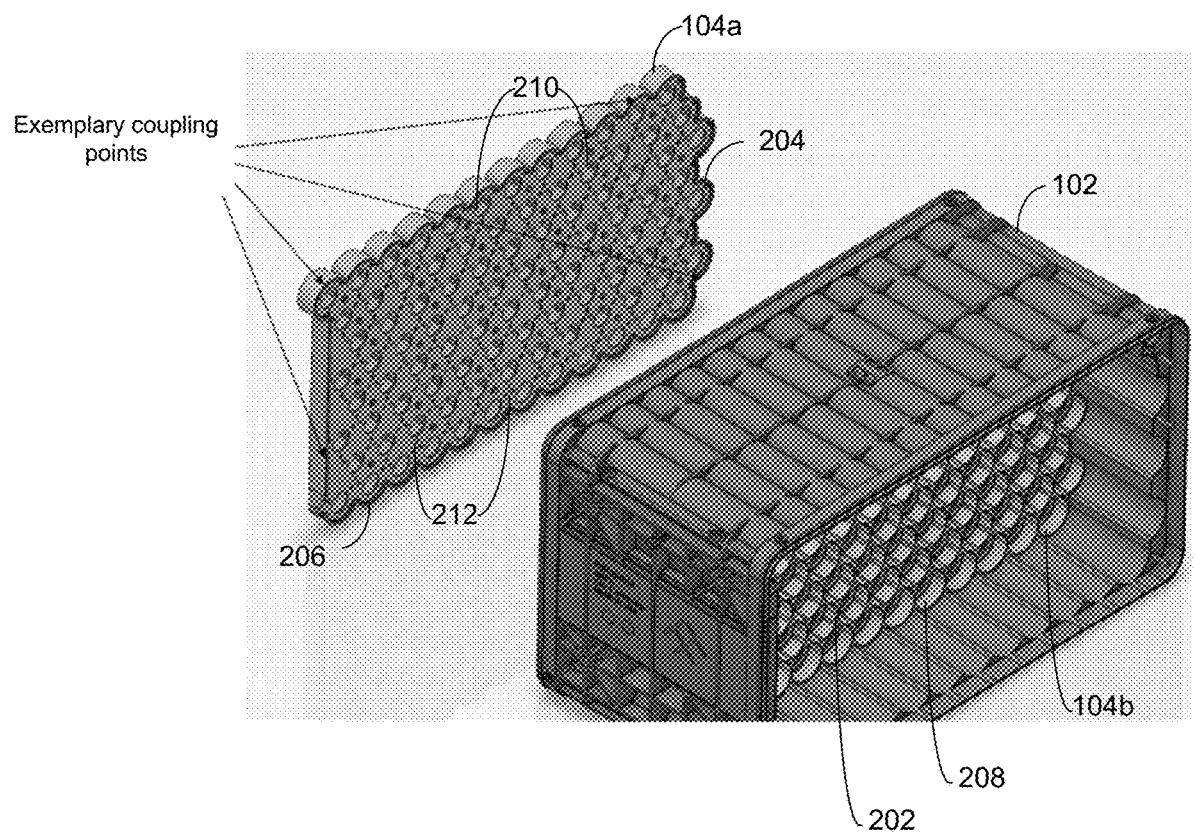
FIG. 2 illustrates an isometric view of a battery module shell of FIG. 1 having a pair of cell ducts of FIG. 1 being inserted thereto, in accordance with certain embodiments described herein.

FIG. 2 illustrates an isometric view of the shell 102 of the energy-storage module 100 of FIG. 1 with two cell duct 104a, 104b. As shown, the cell duct 104b is already inserted into the shell 102 while the cell duct 104a is depicted outside of the shell 102 for purposes of illustrating its lower surface. In some embodiments, the cell ducts 104a, 104b may be coupled to or adhered to the shell 102, for example by being glued to the shell 102 at one or more points.

The cell ducts 104a, 104b each have a top side 202 and an underside 204. The top side 202 may be the side of the cell duct 104a, 104b opposite the side adhered or coupled to the floor 116 of the shell 102 and nearest to the cells 106. The underside 204 may comprise the side of the cell duct 104a, 104b adhered or coupled to the shell 102. In some embodiments, the underside 204 of the cell duct 104a, 104b includes a wall or ridge 206 that extends away from the underside 204 around some or all of the perimeter of the cell duct 104a, 104b. The wall 206 may form the cavity or space (not shown) between the underside 204 of the cell duct 104a, 104b and the shell 102 through which coolant fluid may flow before entering the region of the cells 106. The cavity may receive fluid coolant that flows into the shell 102 and that is used to cool the cells 106 and the energy-storage module 100. In some embodiments, the wall 206 may extend away from the top side 202 of the cell ducts 104a, 104b by a height to create the cavity. In some embodiments, the cavity may allow the fluid coolant to flow to all areas of the cell ducts 104a, 104b to be able to flow to and cool each of the cells 106.

The top side 202 of the cell duct 104a, 104b may comprise a plurality of holders 208 for the cells 106. The holders 208 may each comprise one or more walls that may be used to hold the cells 106 in a particular configuration. The underside 204 of the cell duct 104a, 104b may comprise cell holes 210 that ends of the cells 106 pass through and fluid holes 212 (described in further detail herein) through which the fluid coolant flows to cool the cells 106. The cell holes 210 may pass from the top side 202 of the cell duct 104a, 104b through and to the underside 204 of the cell ducts 104. The fluid holes 212 may pass from the underside 204 of the cell duct 104a, 104b through and to the top side 202 of the cell duct 104a, 104b, thus allowing the coolant fluid flow to the cells 106. In some embodiments, the fluid holes 212 may be placed in proximity to each of the cell holes 210. For example, each cell hole 210 may have one or more fluid holes 212 positioned in proximity to the cell holes 210.

Figure 3:
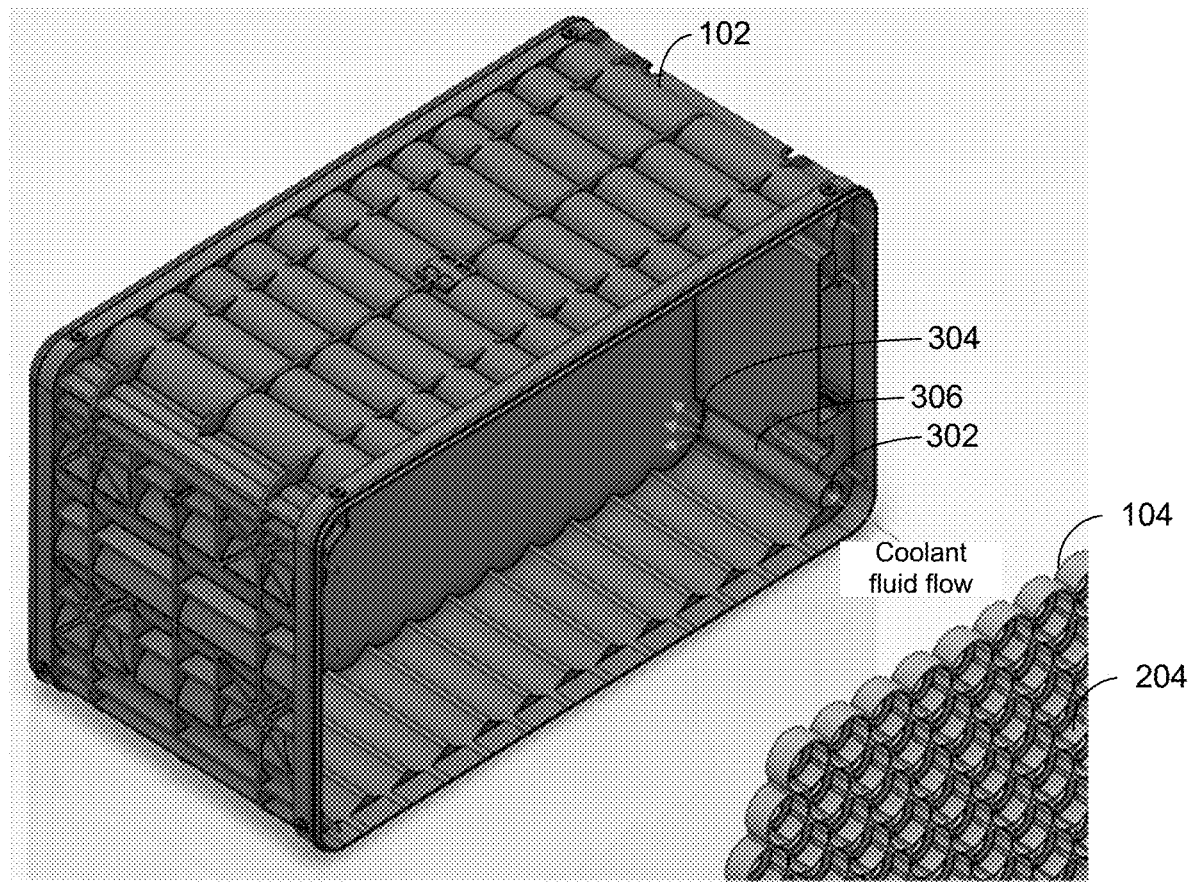
FIG. 3 illustrates an isometric view of the battery module shell and one of the cell ducts that depicts a coolant fluid inlet and dispersal region, in accordance with certain embodiments described herein.

FIG. 3 illustrates an isometric view of the shell 102 and one of the cell ducts 104 positioned outside of the shell 102. FIG. 3 depicts a coolant fluid inlet 302 into the shell 102 and a dispersal region 304 where fluid begins to flow within the enclosure of the shell 102, in accordance with certain embodiments described herein. In the illustrated embodiment, the shell 102 includes a coolant fluid channel 306 leading from the inlet 302 to the dispersal region 304. The coolant fluid inlet 302 includes an opening or aperture where coolant fluid enters the energy-storage module 100 and flows through the coolant fluid channel 306 of the shell 102. The coolant fluid flow out of the coolant fluid channel 306 at the fluid dispersal region 304. Though illustrated with a single inlet 302 and channel 306, some embodiments may provide multiple inlets and channels.

In some embodiments, the coolant fluid inlet 302 may couple to a pressurized coolant fluid system of the EV. The fluid dispersal region 304 may allow the coolant fluid to flow into the cavity formed between the shell 102 and the underside 204 of the cell ducts 104. In some embodiments, the wall 206 of the underside 204 of the cell ducts 104 may comprise an opening, or a reduced height, at the fluid dispersal region 304 to allow the coolant fluid to flow from the coolant fluid inlet 302 into the cavity (formed between the floor 116 of the shell 102 and the underside 202 of the duct 104 as described above) and to each of the fluid holes 212 of the cell ducts 104. The arrows in FIG. 3 represent the flow of coolant into the coolant fluid inlet 302 and out of the fluid dispersal region 304. Though not shown, the shell 102 and/or cover 112 can include a coolant fluid outlet that returns the coolant fluid back to the coolant fluid system (for example, the active cooling system) of the EV after it has cycled through the shell 102 and across the cells 106.

Figure 4:
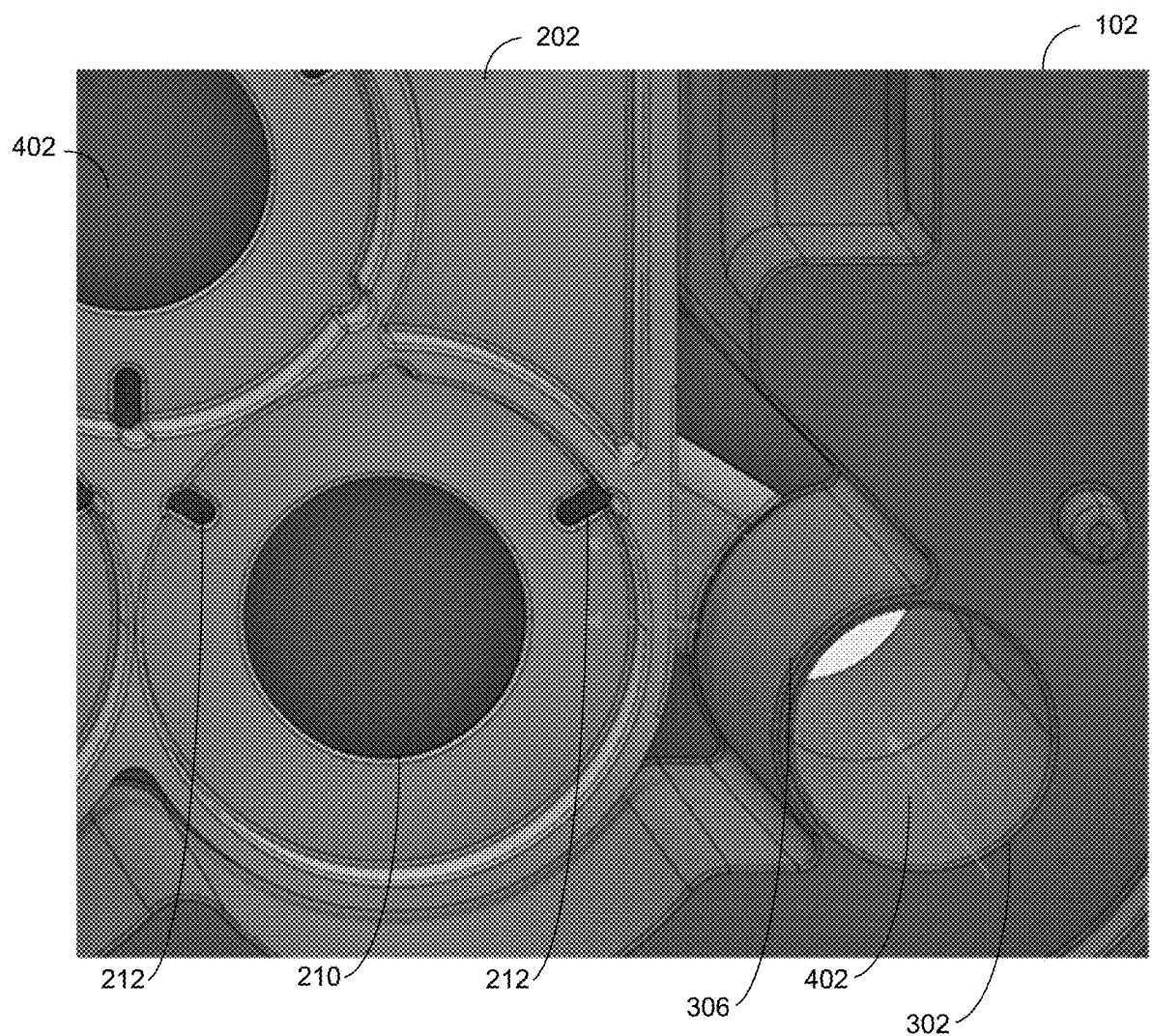
FIG. 4 illustrates a close-up view of the coolant fluid inlet that identifies a fluid flow in via the coolant fluid inlet and dispersal behind the cell ducts, in accordance with certain embodiments described herein.

FIG. 4 illustrates a close-up view of the shell 102 and the top side 202 of the cell duct 104. FIG. 4 that further shows the coolant fluid flow in the coolant fluid channel 306 from the coolant fluid inlet 302 to the coolant dispersal region 304, in accordance with certain embodiments described herein. In some embodiments, as described herein, the coolant fluid channel 306 may provide a path for coolant fluid flow from the coolant fluid inlet 302 to the coolant dispersal region 304. The illustrated arrows shown represent the coolant fluid flow into and through the coolant fluid channel 306 and into the cavity 402 between the cells duct 104 and the shell 102. The coolant fluid may then flow from the cavity 402 through the fluid holes 212 to cool the cells 106. In some embodiments, the cell duct 104 may comprise a portion that couples to the coolant dispersal region 304. In some embodiments, the shell 102 may comprise a portion that extends to the cell duct 104 to provide for coolant fluid flow from the coolant dispersal region 304 to the cavity 402.

In some embodiments, the coolant fluid may be pressurized, meaning that the coolant fluid flow is pumped or otherwise actively forced to flow through the energy-storage module 100. Accordingly, the cavity 402 between the cell ducts 104 and the shell 102 receives the pressurized coolant fluid and distribute it through the fluid holes 212 of the duct 104. As such, the coolant fluid can have a highest pressure at the coolant fluid inlet 302. As it travels across the floor 116 of the shell 102, the pressure of the coolant fluid in the cavity 402 may drop, for example as a function of the distance it has traveled away from the coolant fluid inlet 302. The flow rate of the coolant fluid in different regions of the cavity 402 may be directly related to the pressure of the coolant fluid. For example, higher pressure for the coolant fluid may result in a higher coolant fluid flow rate. Thus, coolant fluid pressures (and coolant fluid flow rates) at regions of the cavity 402 farther away from the coolant fluid inlet 302 may be lower than at regions of the cavity 402 closer to the coolant fluid inlet 302.

Because the coolant fluid pressure and the coolant fluid flow rate is different at different regions in the cavity 402, the coolant fluid flow rate and pressure through the fluid holes 212 will also differ at the different regions. For example, in regions closer to the coolant fluid inlet 302, the coolant fluid flow rate and pressure through the fluid holes 212 may be higher than the coolant fluid flow rate and pressure through the fluid holes 212 of regions farther from the coolant fluid inlet 302. Thus, if the fluid holes 212 in the cell ducts 104 are the same size throughout the cell ducts 104 (for example, same size fluid holes 212 in all regions of the cavity), then the rate of coolant fluid flow would not be constant through all the fluid holes 212 of the cell ducts 104. As such, cells 106 further from the coolant fluid inlet 302 may experience higher temperatures due to lower flow of coolant fluid across such cells 106.

In some embodiments, the benefits of the coolant fluid (for example, the cooling features provided by the coolant fluid) may be directly related to the flow rate of the coolant fluid. For example, higher coolant fluid flow rates and pressure may result in greater cooling of cells that are proximate to the higher coolant fluid flow rates and pressure. Thus, cells 106 of the energy-storage module 100 may be cooled at different rates when the fluid holes 212 of the cell ducts 104 are the same throughout the cell ducts 104. For example, the cells 106 closest to the coolant fluid inlet (for example, nearest to the coolant fluid inlet 302) may be better cooled than cells 106 farther from the coolant fluid inlet. Thus, the cells 106 in the energy-storage module 100 may experience a broader range of individual cell temperatures regardless of the average cell temperature for the energy-storage module 100. While adjusting the coolant fluid pressure at the coolant fluid inlet 302 may change the average cell temperature of the energy-storage module 100, the range of individual cell temperatures may not generally change as consistently. Uneven temperatures of the cells can result in some cells experiencing greater "wear" due to thermal effects than other cells, thereby shortening the overall life of the energy-storage module 100 to correspond to the most highly-thermally-worn cells.

Thus, to achieve greater balance of coolant fluid flow rates and pressures to all the cells 106, the disclosed technology can vary the sizes of the fluid holes 212 in the cell duct 104 based on their distances from the coolant fluid inlet (e.g., the actual distance or the positioning of a given hole 212, or the location of a hole 212 within a certain region). In some embodiments, the smallest fluid holes 212 may be positioned closest to the coolant fluid inlet 302 and the largest fluid holes 212 may be positioned furthest away from the coolant fluid inlet 302. In some embodiments, sizes for each of the fluid holes 212 may be calculated based on a distance between the fluid hole 212 and the coolant fluid inlet 302. Accordingly, as the distance between the fluid holes 212 and the coolant fluid inlet increases, the hole sizes of the fluid holes 212 may increase. In some embodiments, the hole sizes of the fluid holes 212 may be split into a plurality of zones, where the hole sizes of the fluid holes 212 may be consistent within each zone but different between different zones. For example, in some embodiments, the fluid holes 212 may have different shapes than those shown in the figures. In some embodiments, the fluid holes 212 may be circular, elliptical, or any other shape that permits coolant fluid flow therethrough.

In some embodiments, the shell 102 and/or cell duct 104 may be structured to provide multiple coolant fluid inlets and to provide multiple fluid dispersion regions (or zones) into the cavity. The multiple coolant fluid dispersion regions can be positioned in different regions within the cavity. Accordingly, coolant fluid flow rates and pressures in all the regions of the cavity may be higher when there are more coolant fluid inlets into the cavity. In some embodiments, the coolant fluid inlet 302 may be coupled to a plurality of coolant fluid channels formed in or on the underside 204 of the cell ducts 104.

In some embodiments, a combination of one or more of multiple coolant fluid dispersion regions, coolant fluid channels, and varying fluid hole sizes may be implemented in the cell ducts 104.

Figure 5:
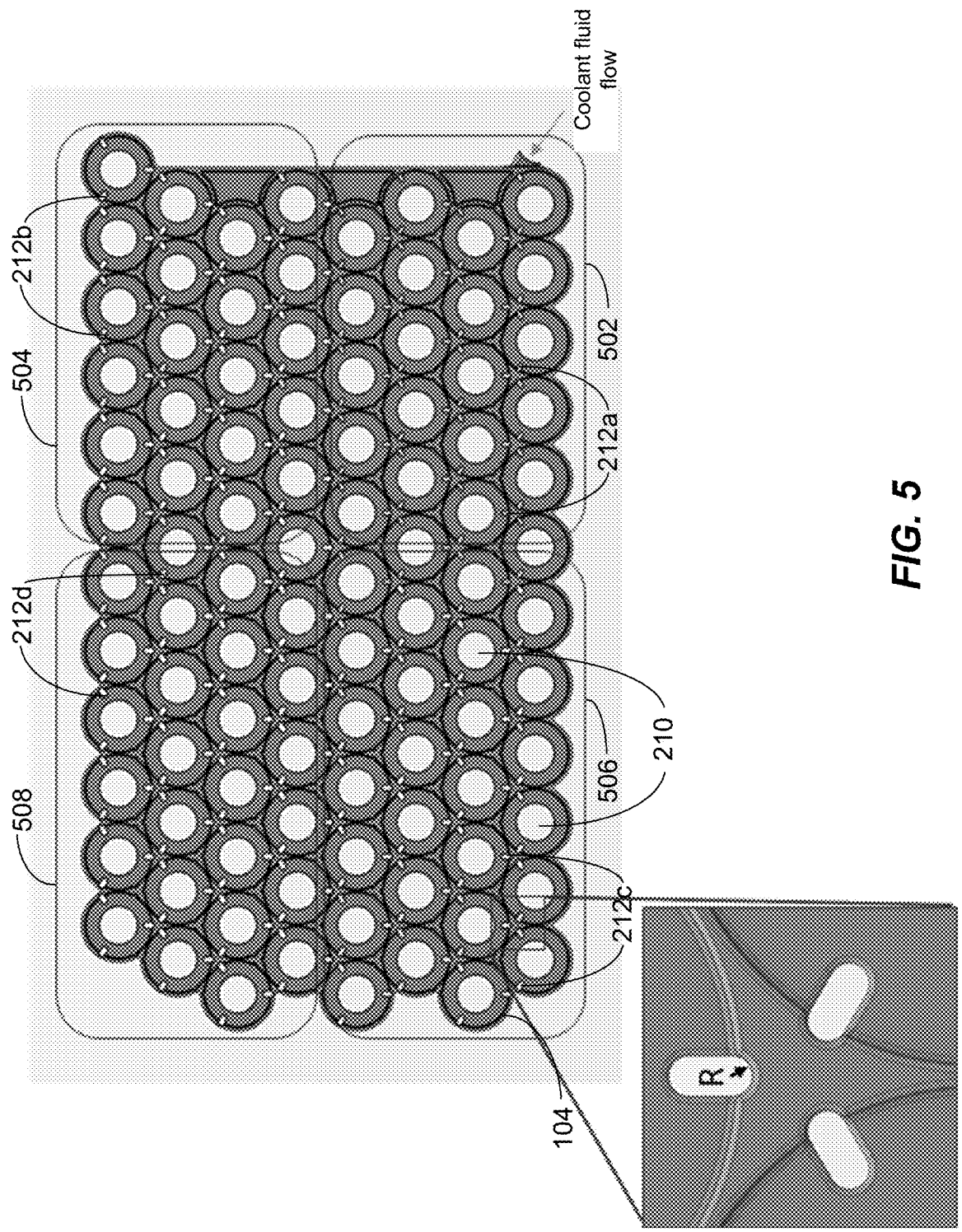
FIG. 5 illustrates a two-dimensional view of the cell duct that includes varying sizes of fluid flow openings in different regions of the cell duct, in accordance with certain embodiments described herein.

FIG. 5 illustrates a top view of the cell duct 104 that includes fluid holes 212 of varying sizes in different regions (or zones) 502, 504, 506, 508 of the cell duct 104, in accordance with certain embodiments described herein. It will be appreciated that the markings shown for the borders of the regions 502, 504, 506, 508 are to provide a visual indication of the size and location of each region, and do not form part of the structure of the duct 104. When referring to a position of each of the zones 502, 504, 506, 508, the present disclosure may use an average distance of the cells 106 within the zone from the coolant fluid dispersal region 304. Thus, in the embodiment shown, the zone 502 is positioned closest to the coolant fluid inlet to the cavity (for example, the coolant fluid dispersal region 304). The zone 504 may be positioned the next closest to the coolant fluid inset to the cavity, with the zone 506 positioned the third closest to the coolant fluid insert to the cavity. The zone 508 may be positioned the farthest from the coolant fluid inset to the cavity. In some embodiments, the zones 502, 504, 506, 508 may not be physically separated from each other. For example, there may not exist any walls or other divisions separating the different zones 502, 504, 506, 508, such that coolant fluid flows freely through the cavity and into the holes 212.

In the illustrated embodiment, the fluid hole sizes differ for each of the zones 502, 504, 506, 508. For example, the fluid holes 212a in the zone 502 may be the smallest of the fluid holes 212 in any of the zones 502, 504, 506, 508. In some embodiments, the fluid holes 212b in the zone 504 may be the second smallest of the fluid holes 212 in the zones 502, 504, 506, 508. In some embodiments, the fluid holes 212c in the zone 506 may be the third smallest of the fluid holes 212 in the zones 502, 504, 506, 508. The fluid holes 212d in the zone 508 may be the largest of the fluid holes 212 in the zones 502, 504, 506, 508. For example, in some embodiments, the fluid holes 212a, 212b, 212c, and 212d may all be circuilar and have dimensions of 0.550 millimeters (mm), 0.750 mm, 0.825 mm, and 0.875 mm, respectively. In some embodiments, the ratios between the fluid holes' dimensions may be relatively or substantially similar as those based on the dimensions above even as the dimensions change. In some embodiments, the ratios of the fluid holes 212 in the different zones may change as the dimensions of the fluid holes 212 change.

As noted above, the different fluid hole sizes may provide for different coolant fluid flow rates through the holes in order to achieve substantially similar fluid flow rates to the cells coupled to each of the regions. Thus, even though regions of the the cavity underlying each of the zones 502, 504, 506, 508 may have different fluid flow pressures, by customizing the fluid hole sizes for each of the zones 502, 504, 506, 508, the fluid flow rates through the fluid holes 212 in the zone 502 may be substantially the same as compared to fluid flow rates through the fluid holes 212 in the other zones 504-508. In some embodiments, such similar fluid flow rates throughout the cell ducts 104 may result in a smaller range of individual cell temperatures in the energy-storage module 100 as compared to energy-storage modules 100 having fluid hole sizes that are the same for the entire cell duct 104. Though FIG. 5 illustrates each region having holes of a single size within the region, in some embodiments the holes within a region can vary in order to further balance the rate of fluid flow. In other embodiments, regions may not be used, and the sizes of the holes may vary as a function of their distance from the fluid outlet.

A thermal analysis of the cells 106 based on the embodiment shown in FIG. 5 may indicate that, even with optimized fluid hole sizes based on zones 502, 504, 506, 508 of the cell ducts 104, the cells 106 furthest from the coolant fluid inlet see the highest temperatures, about 10° C. difference between coolest and warmest cells 106. This uneven temperature within the energy-storage module 100 can lead to premature degradation of the warmer cells 106 over time, and eventually lead to failure of the energy-storage module 100.

Figure 6:
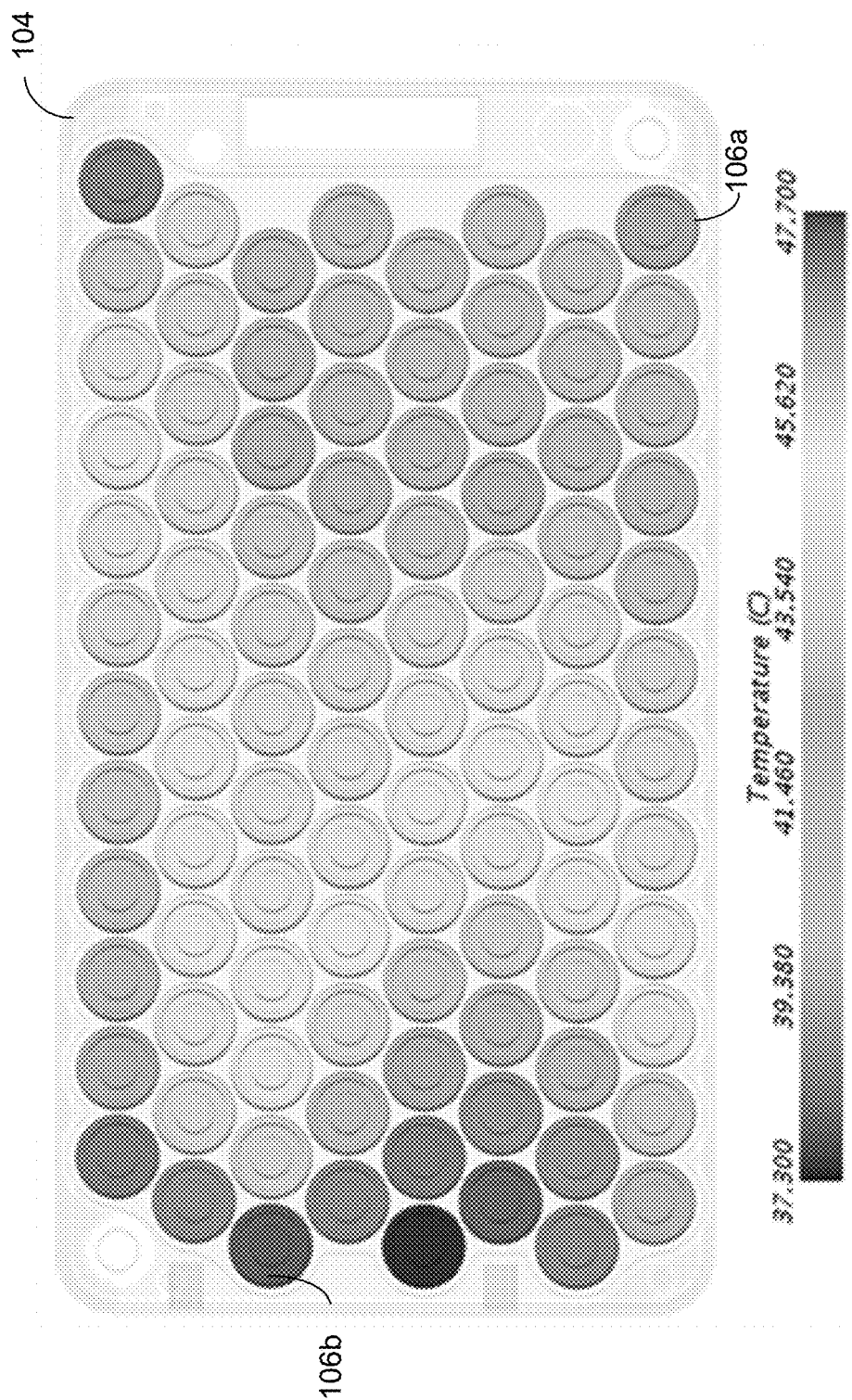
FIG. 6 illustrates a two-dimensional thermal image of cells of FIG. 1 disposed in the cell duct of FIG. 2 that indicates temperatures of individual cells arranged in the battery module of FIG. 1, in accordance with certain embodiments described herein.

FIG. 6 illustrates a top view thermal image of the cells 106 of FIG. 1 disposed in a cell duct 104 that includes the optimized hole sizes of FIG. 5. The scale of FIG. 6 shows which grayscale intensities indicate different temperatures of individual cells 106. The cell duct 104 may include the coolant fluid inlet in the bottom right corner of the cell duct 104 as shown.

The measured temperatures of the cells 106 in the energy-storage module 100 may range from approximately 37 degrees Celsius (° C.) to 48° C. As shown, the cell 106a may have a temperature of approximately 38° C. The cell 106a may have such a low temperature due to its proximity to the single coolant fluid inlet of the cell duct 104. The cell 106b may have a temperature of approximately 48° C. The cell 106b may have such a high temperature due to its proximity to (for example, being the farthest cell 106 from) the single coolant fluid inlet of the cell duct 104. Thus, the thermal image shows that there is approximately a 10° C. difference between the coolest and warmest cells 106 of the energy-storage module 100. In some embodiments, the thermal image depicted may correspond to the energy-storage module 100 using the cell ducts 104 with varying zones of fluid hole sizes, as described in relation to FIG. 5.

There are multiple reasons why the range of cell temperatures exist. For example, even with optimized hole sizes, the outlying cells 106 of each zone 502, 504, 506, 508 may still be starved for fluid flow due to pressure drops across each respective zone 502, 504, 506, 508. A possible solution may be to optimize the fluid hole sizes for each individual cell location (as noted briefly above), but this may increase cost of design and manufacture of the cell ducts 104. In some embodiments, the increased temperatures of outlying cells 106 may be caused by the coolant fluid picking up heat from the bottom sides of the cells 106 as the fluid traverses across the length of the energy-storage module in the cavity.

FIG. 7 illustrates a two-dimensional view of the cell duct 104 that includes varying sizes of fluid holes 212 in different zones 702, 704, 706, 708 of the cell duct 104 and zone barriers or walls 710a-710c that may control coolant fluid flow into each of the different zones 702, 704, 706, 708 of the cell duct 104, in accordance with certain embodiments described herein. For example, the energy-storage module 100 shown may have a single coolant fluid inlet at or near the bottom right corner of the cell duct 104. In some embodiments, as noted in relation to FIG. 5, the cell duct 104 may be split into four zones 702, 704, 706, 708. However, unlike the zones 502, 504, 506, 508 of FIG. 5, the zones 702, 704, 706, 708 may be physically formed or separated from each other.

In order to balance the coolant fluid flows between the zones 702, 704, 706, 708, in some embodiments physical walls 710a-710c, extending out from the cell duct 104 and mating with the shell 102, similar to the wall 206, create the four zones. In some embodiments, additional zones may be created with more walls 710. In some embodiments, the walls 710a-710c may prevent coolant fluid flow between different zones created by the walls 710a-710c. Though described in this example as being part of the cell duct 104, the walls 710a-710c may be formed in one or both of the cell duct 104 and the floor 116 of the shell 102, or formed as a separate structure and then sealed to the cell duct 104 and shell 102. The walls 710a-710c form channels 712a-712c and a non-channel fluid path 714 each leading to one of the four zones 702, 704, 706, 708. The channels 712a-712c branch directly from the coolant fluid inlet to one of the regions, while the fluid path 714 represents fluid flowing out of the inlet into the closest zone 702.

The coolant fluid is delivered to each zone 702, 704, 706, 708 via one of the channels 712a-712c and the non-channel fluid path 714. In some embodiments, to further balance the flows to all zones 702, 704, 706, 708, if needed, the channel opening size can be tailored to account for friction losses and to increase the flow to the zones furthest from the single coolant fluid inlet. For example, in some embodiments, the coolant fluid channel 712a or 712b may be wider or have a larger channel opening size than the coolant fluid channel 712c because the coolant fluid channels 712a and 712b have a longer distance to travel than the coolant fluid channel 712c, which may result in increased friction losses and reduced coolant flow rates.

In some embodiments, the three zone barriers or walls 710a-710c may exist to separate the cell duct 104 into the four regions 702, 704, 706, 708 and create the channels 712a-712c for the coolant fluid flow paths 714-720. For example, the wall 710a, running from the single coolant fluid inlet to a first point along the wall 206, may create a boundary around the zone 702. Thus, the wall 710a may separate the zone 702 from the zone 706 and the fluid flow channels 712a-712c. In some embodiments, the wall 710b may run from the single coolant fluid inlet to a second point along the wall 206, creating a boundary between the zone 706 and the zone 708. The wall 710b may also create a separation between the fluid flow channels 712a and 712b. In some embodiments, the wall 710c may create a boundary around the zone 704, running from the single coolant fluid inlet to a third point along the wall 206. The wall 710c may separate the zone 704 from the zone 708 and from the fluid flow channels 712a-712c.

The walls 710a-710c may create the fluid flow channels 712a-712c and provide for the coolant fluid flow paths 714-720 to each of the zones 702, 704, 706, 708, respectively. For example, the coolant fluid flow channel 712a (providing coolant fluid to the zone 706 along the coolant fluid flow path 716) may exist between the wall 710a and the wall 710b. In some embodiments, the coolant fluid flow channel 712b may exist between the wall 710b and the wall 710c and may provide for coolant fluid along the coolant fluid flow path 718 from the single coolant fluid inlet to the zone 708. In some embodiments, the coolant fluid flow channel 712c may exist between the wall 710c and the wall 206 and may provide for coolant fluid flow from the single coolant fluid inlet to the zone 704 along the coolant fluid flow path 720. The coolant fluid flow path 714 may exist in the single coolant fluid inlet between the wall 206 and the wall 710a and provide coolant fluid to the zone 702.

In some embodiments, the creation of the fluid flow channels 712a-712c that provide for the coolant fluid flow paths 714-720 may provide for a more consistent coolant fluid pressure within each of the zones 702, 704, 706, 708. For example, in the cell duct 104 embodiment shown in FIG. 5, when each of the zones 502, 504, 506, 508 receive coolant fluid flow from the single coolant fluid inlet, the flow rates of the coolant fluid decrease as the coolant fluid travels away from the single coolant fluid inlet. However, by introducing the fluid flow channels 712a-712c, the pressure of the coolant fluid through the coolant fluid flow paths 714-720 may be more similar between the different channels and the flow directly into the zone 702. Thus, the coolant fluid flow paths 714-720 within each zone 702, 704, 706, 708 is also more similar than when compared to the coolant fluid flow rates in the zones 502, 504, 506, 508.

In some embodiments, the coolant fluid channels 712a-712c may be combined with the varying hole sizes between the different zones 702, 704, 706, 708 (as discussed in relation to FIG. 5). Such varying hole sizes may provide further benefit of maintaining similar coolant fluid flow rates through the fluid holes 212 of the various zones 702, 704, 706, 708 where the coolant fluid flow rates may still be slightly different between the different zones 702, 704, 706, 708 even with the coolant fluid channels 712a-712c.

Figure 8A:
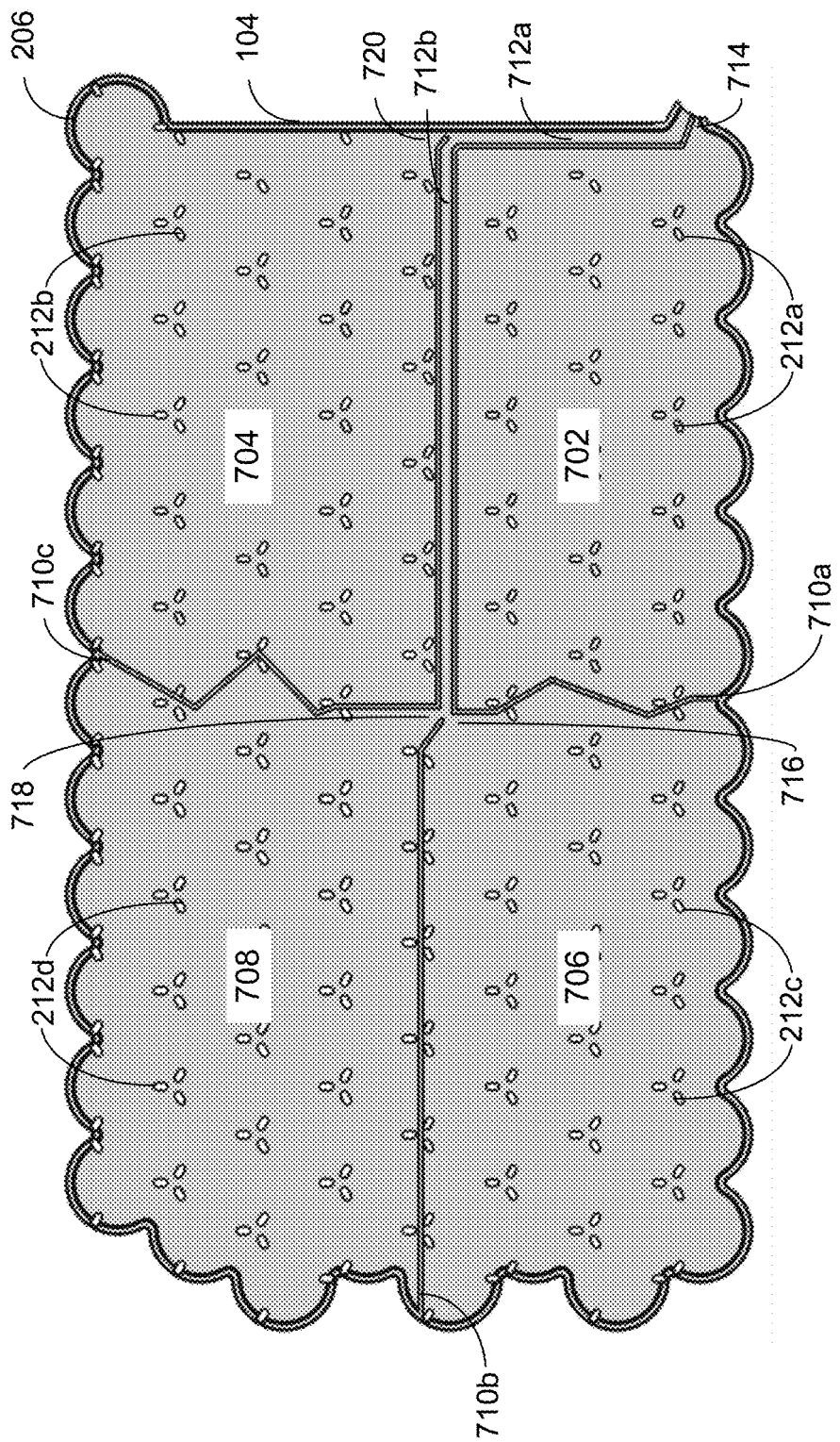
FIG. 8A illustrates a two-dimensional view of another embodiment of the cell duct that includes varying sizes of fluid holes in different zones of the cell duct and zone barriers that may control coolant fluid flow into each of the different zones of the cell duct, in accordance with certain embodiments described herein.

FIG. 8A illustrates a two-dimensional view of another embodiment of the cell duct 104 that includes the varying sizes of the fluid holes 212 in the different zones 702, 704, 706, 708 of the cell duct 104 and the zone barriers 710a-710c that may control coolant fluid flow into each of the different zones 702, 704, 706, 708 of the cell duct 104, in accordance with certain embodiments described herein. For example, the energy-storage module 100 shown may have a single coolant fluid inlet at or near the bottom right corner of the cell duct 104. In some embodiments, as noted in relation to FIGS. 5 and 7, the cell duct 104 may be split into four zones 702, 704, 706, 708. However, unlike the zones 502, 504, 506, 508 of FIG. 5, the zones 702, 704, 706, 708 may be physically formed or separated from each other, similar to the zones in FIG. 7.

In order to balance the coolant fluid flows between the zones 702, 704, 706, 708, in some embodiments, as described in reference to FIG. 7, the physical walls 710a-710c extend out from the cell duct 104 and mate with the shell 102, similar to the wall or ridge 206, to create the four zones 702, 704, 706, and 708. In some embodiments, additional zones may be created with more walls 710. Though described in this example as being part of the cell duct 104, the walls 710a-710c may be formed in one or both of the cell duct 104 and the floor 116 of the shell 102, or formed as a separate structure and then sealed to the cell duct 104 and shell 102. The walls 710a-710c form channels 712a-712b and the fluid paths 714, 716, 718, and 720, each leading to one of the four zones 702, 704, 706, 708. The channels 712a-712b each convey the coolant fluid to a plurality of the regions. However, different from the cell duct 104 of FIG. 7, the walls 710a-710c do not form individual fluid channels that provide for coolant fluid flow to individual regions. Instead, the channels 712a-712b are each formed between two walls, where channel 712a is formed between the wall 710a and the ridge 206 and channel 712b is formed between the wall 710a and wall 710c. The wall 710b, instead of extending into the channel, instead starts at an outputting or dispensing mouth of channel 712b and splits or separates the mouth into the two fluid paths 716 and 718 for zones 706 and 708, respectively. Similar to FIG. 7, the fluid path 714 represents fluid flowing out of the inlet into the closest zone 702.

The coolant fluid is delivered to each zone 702, 704, 706, 708 via one of the channels 712a-712b and the non-channel fluid path 714, similar to FIG. 7. In some embodiments, to further balance the flows to all zones 702, 704, 706, 708, if needed, the channel opening size can be tailored to account for friction losses and to increase the flow to the zones furthest from the single coolant fluid inlet. For example, in some embodiments, the coolant fluid channel 712a may be wider or have a larger channel opening size than the coolant fluid channel 712b because the coolant fluid channel 712a conveys coolant fluid for each of zones 704, 706, and 708 and the coolant fluid traveling therein has a longer distance to travel than the fluid through the non-channel fluid path 714, which may result in increased friction losses and reduced coolant flow rates.

In some embodiments, the three zone barriers or walls 710a-710c may exist to separate the cell duct 104 into the four regions 702, 704, 706, 708 and create the coolant fluid flow paths 714-720. For example, the wall 710a, running from the single coolant fluid inlet to a first point along the wall 206, may create a boundary around the zone 702. Thus, the wall 710a may separate the zone 702 from the zone 706 and the fluid flow channels 712a-712b. In some embodiments, the wall 710b may run from the outlet of the flow channel 712b to a second point along the wall 206, creating a boundary between the zone 706 and the zone 708. The wall 710b may also create a separation between the fluid paths 716 and 718. In some embodiments, the wall 710c may create a boundary around the zone 704, running from the fluid path 720 inlet to a third point along the wall 206. The wall 710c may separate the zone 704 from the zone 708 and from the fluid flow channel 712b.

The walls 710a-710c may create the fluid flow channels 712a-712b and provide for the coolant fluid flow paths 714-720 to each of the zones 702, 704, 706, 708, respectively. For example, the coolant fluid flow channel 712a (providing coolant fluid to the zone 704 via the fluid path 720 and to the fluid flow channel 712b) may exist between the wall 710a and the ridge 206. In some embodiments, the coolant fluid flow channel 712b may exist between the wall 710a and the wall 710c and may provide for coolant fluid to the flow paths 716 and 718 from the single coolant fluid inlet to the zones 706 aand 708.

In some embodiments, the creation of the fluid flow channels 712a-712b that provide for the coolant fluid flow paths 714-720 may provide for a more consistent coolant fluid pressure within each of the zones 702, 704, 706, 708. For example, in the cell duct 104 embodiment shown in FIG. 5, when each of the zones 502, 504, 506, 508 receive coolant fluid flow from the single coolant fluid inlet, the flow rates of the coolant fluid decrease as the coolant fluid travels away from the single coolant fluid inlet. However, by introducing the fluid flow channels 712a-712b, the pressure of the coolant fluid through the coolant fluid flow paths 714-720 may be more similar between the different channels and the flow directly into the zone 702. Thus, the coolant fluid flow paths 714-720 within each zone 702, 704, 706, 708 is also more similar than when compared to the coolant fluid flow rates in the zones 502, 504, 506, 508.

In some embodiments, the coolant fluid channels 712a-712b may be combined with the varying hole sizes for the fluid holes 212a-212d between the different zones 702, 704, 706, 708, respectively (as discussed in relation to FIG. 5). Such varying hole sizes may provide further benefit of maintaining similar coolant fluid flow rates through the fluid holes 212 of the various zones 702, 704, 706, 708 where the coolant fluid flow rates may still be slightly different between the different zones 702, 704, 706, 708 even with the coolant fluid channels 712a-712c.

Figure 8B:
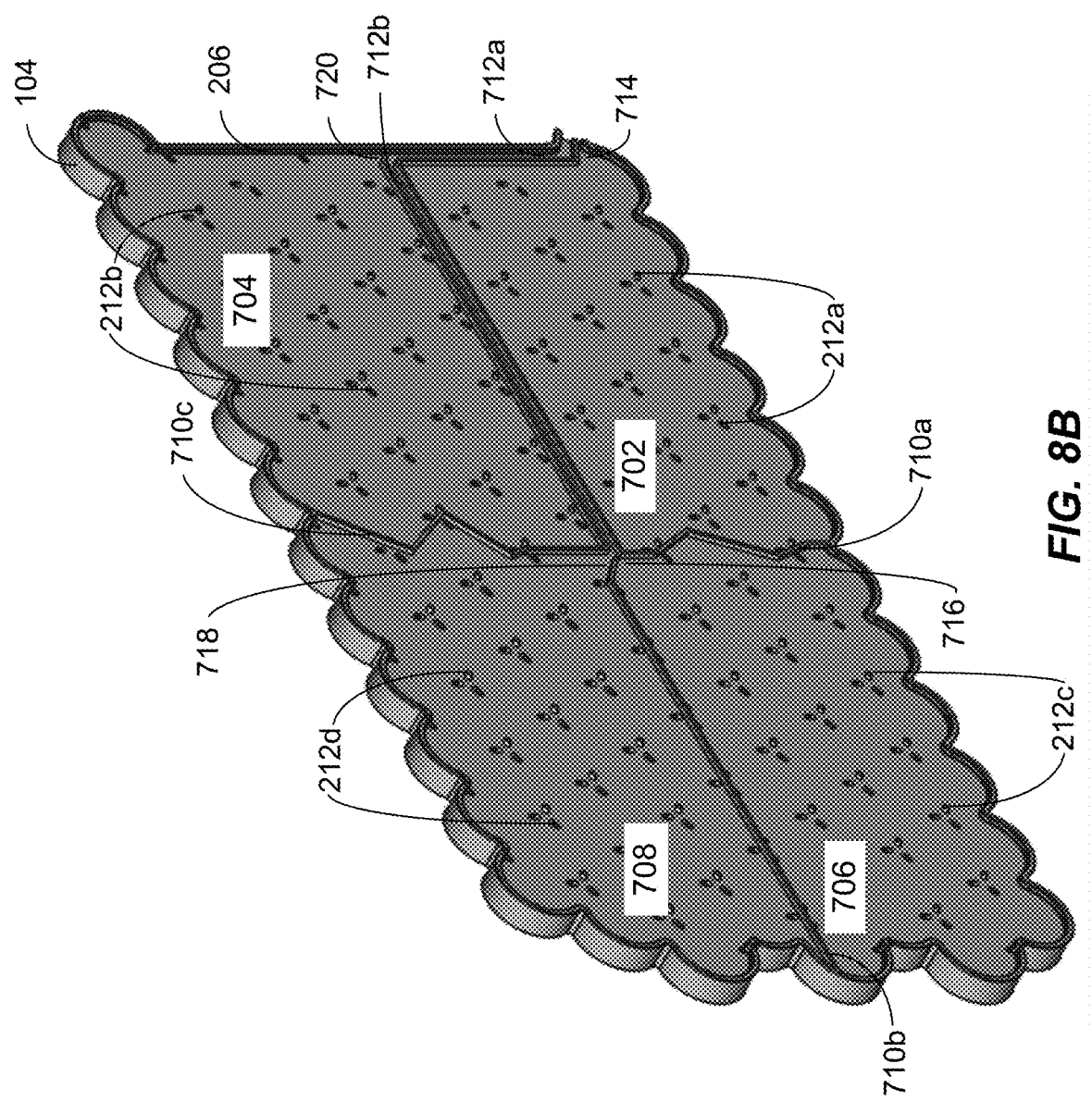
FIG. 8B illustrates a perspective view of the embodiment of the cell duct depicted in FIG. 8A, in accordance with certain embodiments described herein.

FIG. 8B illustrates a perspective view of the embodiment of the cell duct 104 depicted in FIG. 8A. FIG. 8B provides the perspective view to depict how the physical walls 710a-710c extend out from the cell duct 104 and may mate with a bottom surface (or surface facing the cell duct 104) of the shell 102 (not shown in this figure), similar to the wall or ridge 206, to create the four zones 702, 704, 706, and 708. Though described in this example as being part of the cell duct 104, the walls 710a-710c may be formed in one or both of the cell duct 104 and the floor 116 of the shell 102, or formed as a separate structure and then sealed to one or both of the cell duct 104 and shell 102. Furthermore, FIG. 8B also shows that the walls 710a-710c form the channels 712a-712b and the fluid paths 714, 716, 718, and 720, each of the fluid paths leading to one of the four zones 702, 704, 706, 708. The channels 712a-712b each convey the coolant fluid to a plurality of the regions. However, different from the cell duct 104 of FIG. 7, the walls 710a-710c do not form individual fluid channels that provide for coolant fluid flow to individual regions.

Other Considerations

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. An apparatus for storing energy, the apparatus comprising:
    an enclosure including a coolant fluid inlet configured to couple to a coolant fluid system; and
    a plurality of energy-storage cells housed in an arrangement within a region of the enclosure;
    a cell holder having:
        a first side forming a cavity between the cell holder and an adjacent wall of the enclosure, wherein the coolant fluid inlet is in fluid communication with the cavity,
        a second side comprising retaining features configured to hold the plurality of cells in the arrangement, the second side opposite the first side of the cell holder and facing the region formed between the second side and the enclosure, and
        a plurality of holes that pass from the cavity through the cell holder and to the region of the enclosure housing the plurality of energy-storage cells, wherein the plurality of holes allow passage of the coolant fluid from the first side through the cell holder to the second side to cool the plurality of cells disposed in the region between the second side and the enclosure, wherein each of the plurality of holes is positioned proximate to a cell of the plurality of cells;
    wherein, in use, coolant fluid passes through the coolant fluid inlet into the cavity and through the plurality of holes to the plurality of cells to reduce a temperature of each of the plurality of cells.

2. The apparatus of claim 1, wherein the plurality of holes comprises a first set of holes positioned in a first region of the cell holder, each of the first set of holes having a first size, and a second set of holes in a second region of the cell holder, each of the second set of holes having a second size greater than the first size, wherein a first fluid flow rate through the first set of holes is substantially the same as a second fluid flow rate through the second set of holes based on a total fluid flow rate at the coolant fluid inlet, and wherein the second set of holes is further from the coolant fluid inlet than the first set of holes.

3. The apparatus of claim 1, wherein the plurality of holes comprises a first set of holes in a first region of the cell holder and a second set of holes in a second region of the cell holder, the cell holder further comprising a first internal wall extending from the first side to contact the adjacent wall of the enclosure and configured to prevent the coolant fluid from flowing from the first region to the second region.

4. The apparatus of claim 3, wherein the cell holder further comprises a first channel configured to convey the coolant fluid to the first region and the second region.

5. The apparatus of claim 3, wherein the cell holder further comprises a first channel configured to convey a first portion of the coolant fluid to the first region and a second channel configured to convey a second portion of the coolant fluid to the second region.

6. The apparatus of claim 5, wherein the first channel has a first width, wherein the second channel has a second width that is greater than the first width, and wherein the second width compensates for additional friction in the second channel due to the second region being further from the coolant fluid inlet than the first region.

7. The apparatus of claim 5, wherein the cell holder further comprises a second wall and wherein the first channel is formed between the first internal wall and the second wall.

8. A method of manufacturing an apparatus for storing energy, the method comprising:
forming an enclosure, the enclosure including a coolant fluid inlet that couples to a coolant fluid system;
forming a cell holder with a plurality of holes;
inserting the cell holder, having (1) a first side and (2) a second side opposite the first side and comprising retaining features configured to hold the plurality of cells in the arrangement, into a region of the enclosure, such that:
the first side of the cell holder forms a cavity between the cell holder and an adjacent wall of the enclosure, wherein the coolant fluid inlet is in fluid communication with the cavity, and
the second side of the cell holder faces the region formed between the second side and the enclosure,
wherein the plurality of holes in the cell holder provide fluid passages from the cavity through the cell holder and to the region of the enclosure housing the plurality of energy-storage cells, wherein the plurality of holes allow passage of coolant fluid from the first side through the cell holder to the second side to cool the plurality of cells disposed in the region between the second side and the enclosure, wherein each of the plurality of holes is positioned proximate to a cell of the plurality of cells; and
providing the coolant fluid to the plurality of cells via the coolant fluid inlet and the plurality of holes to reduce a temperature of each of the plurality of cells.

9. The method of claim 8, further comprising:
forming a first set of holes of the plurality of holes in a first region of the cell holder, each hole of the first set of holes having a first size; and
forming a second set of holes of the plurality of holes in a second region of the cell holder, each hole of the second set of holes having a second size greater than the first size;
wherein a first fluid flow rate through the first set of holes is substantially the same as a second fluid flow rate through the second set of holes based on a total fluid flow rate at the coolant fluid inlet.

10. The method of claim 8, further comprising:
forming a first set of holes of the plurality of holes in a first region of the cell holder, each hole of the first set of holes having a first size; and
forming a second set of holes of the plurality of holes in a second region of the cell holder, each hole of the second set of holes having a second size greater than the first size; and
forming a first internal wall between the first region and the second region, the first internal wall configured to prevent coolant fluid flow from the first region to the second region.

11. The method of claim 10, further comprising forming a first channel to convey the coolant fluid to the first region and the second region from the coolant fluid inlet.

12. The method of claim 10, further comprising forming a first channel to convey a first portion of the coolant fluid to the first region from the coolant fluid inlet and forming a second channel configured to convey a second portion of the coolant fluid to the second region from the coolant fluid inlet.

13. The method of claim 12, wherein forming the first channel comprising forming the first channel with a first width, wherein forming the second channel comprising forming the second channel with a second width that is greater than the first width, and wherein the second width compensates for additional friction in the second channel due to the second region being further from the coolant fluid inlet than the first region.

14. The method of claim 12, further comprising forming a second wall of the cell holder and wherein the first channel is formed between the first internal wall and the second wall.

15. A method for cooling an apparatus for storing energy, the method comprising:
providing power from a plurality of energy-storage cells housed in an arrangement within a region of an enclosure, the enclosure including a coolant fluid inlet that couples to a coolant fluid system and the plurality of energy-storage cells arranged according to a cell holder having (1) a first side forming a cavity between the cell holder and an adjacent wall of the enclosure, wherein the coolant fluid inlet is in fluid communication with the cavity, and (2) a second side comprising retaining features configured to hold the plurality of cells in the arrangement, the second side opposite the first side of the cell holder and facing the region formed between the second side and the enclosure;
providing coolant fluid to each of the plurality of energy-storage cells via particular ones of a plurality of holes that pass from the cavity through the cell holder and to the region of the enclosure housing the plurality of energy-storage cell, wherein the plurality of holes allow passage of the coolant fluid from the first side through the cell holder to the second side to cool the plurality of cells disposed in the region between the second side and the enclosure, wherein each of the plurality of holes is positioned proximate to a cell of the plurality of cells; and cooling each of the plurality of energy-storage cells with the coolant fluid that passes through the coolant fluid inlet into the cavity and through the plurality of holes to the plurality of cells by reducing a temperature of each of the plurality of cells.

16. The method of claim 15, further comprising:

controlling the providing of the coolant fluid via a first set of holes of the plurality of holes in a first region of the cell holder, each hole of the first set of holes having a first size, and controlling the providing of the coolant fluid via a second set of holes of the plurality of holes in a second region of the cell holder, each hole of the second set of holes having a second size greater than the first size, wherein a first fluid flow rate through the first set of holes is substantially the same as a second fluid flow rate through the second set of holes based on a total fluid flow rate at the coolant fluid inlet.

17. The method of claim 15, further comprising:

controlling the providing of the coolant fluid via a first set of holes of the plurality of holes in a first region of the cell holder, each hole of the first set of holes having a first size; and controlling the providing of the coolant fluid via a second set of holes of the plurality of holes in a second region of the cell holder, each hole of the second set of holes having a second size greater than the first size; and preventing the coolant fluid from flowing between the first region and the second region via a first internal wall disposed between the first region and the second region.

18. The method of claim 17, further comprising conveying a first portion of the coolant fluid to the first region from the coolant fluid inlet via a first channel and conveying a second portion of the coolant fluid to the second region from the coolant fluid inlet via a second channel.

19. The method of claim 18, further comprising compensating for additional friction in the second channel due to the second region being further from the coolant fluid inlet than the first region, the first channel having a first width, the second channel having a second width greater than the first width.

20. The method of claim 18, wherein conveying the first portion of the coolant fluid comprises conveying the first portion via the first channel formed between the first internal wall and a second wall.

\* \* \* \* \*